METAL-CLAD SWITCHGEAR EMPLOYING VACUUM TYPE CIRCUIT INTERRUPTERS

Filed Aug. 13, 1965 8 Sheets-Sheet 1

INVENTORS:
KENNETH G. DARROW,
CHARLES H. TITUS,
BY William Freedman
ATTORNEY

METAL-CLAD SWITCHGEAR EMPLOYING VACUUM TYPE CIRCUIT INTERRUPTERS

Filed Aug. 13, 1965 8 Sheets-Sheet 2

INVENTORS:
KENNETH G. DARROW,
CHARLES H. TITUS,
BY William Freedman
ATTORNEY

INVENTORS:
KENNETH G. DARROW,
CHARLES H. TITUS,
BY William Freedman
ATTORNEY

INVENTORS:
KENNETH G. DARROW,
CHARLES H. TITUS,

BY William Freedman
ATTORNEY

Aug. 13, 1968 K. G. DARROW ETAL 3,397,293

METAL-CLAD SWITCHGEAR EMPLOYING VACUUM TYPE CIRCUIT INTERRUPTERS

Filed Aug. 13, 1965 8 Sheets-Sheet 5

INVENTORS:
KENNETH G. DARROW,
CHARLES H. TITUS,

BY William Freedman
ATTORNEY

METAL-CLAD SWITCHGEAR EMPLOYING VACUUM TYPE CIRCUIT INTERRUPTERS

Filed Aug. 13, 1965 8 Sheets-Sheet 6

INVENTORS:
KENNETH G. DARROW,
CHARLES H. TITUS,

BY William Freedman
ATTORNEY

INVENTORS:
KENNETH G. DARROW,
CHARLES H. TITUS,
BY William Freedman
ATTORNEY

METAL-CLAD SWITCHGEAR EMPLOYING VACUUM TYPE CIRCUIT INTERRUPTERS

Filed Aug. 13, 1965 8 Sheets-Sheet 8

INVENTORS:
KENNETH G. DARROW,
CHARLES H. TITUS,
BY William Friedman
ATTORNEY

United States Patent Office 3,397,293

Patented Aug. 13, 1968

3,397,293
METAL-CLAD SWITCHGEAR EMPLOYING VACUUM TYPE CIRCUIT INTERRUPTERS

Kenneth G. Darrow, Wallingford, and Charles H. Titus, Newtown Square, Pa., assignors to General Electric Company, a corporation of New York Filed Aug. 13, 1965, Ser. No. 479,373
14 Claims. (Cl. 200—50)

This invention relates to metal-clad switchgear and relates more particularly to metal-clad switchgear that employs vacuum-type circuit interrupters for interrupting and closing the circuit extending therethrough.

Metal-clad switchgear typically comprises a grounded metal cabinet into which bus bars extend and out of which line conductors extend. For controlling the connection between the bus bars and the line conductors, there is provided a movable circuit breaker unit that can be inserted into and removed from the cabinet. This movable circuit breaker unit has a connected position inside the cabinet where it is effective to conduct current between the bus bars and the line conductors. The circuit breaker unit also has a disconnected position into which it can be moved from its connected position to effect electrical isolation between the bus bars and the line conductors.

For controlling the circuit extending therethrough when in its connected position, the removable circuit breaker unit typically employs a plurality of interrupters. Assuming a three phase alternating current circuit, the circuit breaker unit employs three interrupters, one for each phase of the circuit. In the past, the movable circuit breaker unit has typically relied upon interrupters of the liquid or air type. A recently introduced and highly effective type of interrupter is the vacuum-type of interrupter, and the present invention is concerned with metal-clad switchgear which utilizes such vacuum-type interrupters instead of the oil or air interrupters of prior designs.

While a vacuum interrupter has many advantages as an interrupting device and has a relatively small total volume, it does require a relatively large amount of space in a direction perpendicular to the power conductor extending therethrough. In this regard, the interrupter typically comprises a cylinder through which a single phase conductor extends, and this cylinder must be of a rather large diameter to provide for the desired performance of the interrupter. Moreover, a certain minimum spacing must be allowed between the cylinders of adjacent phases to provide the necessary phase-to-phase electrical clearances.

The maximum permissible width of a movable circuit breaker unit for metal-clad switchgear is severely limited by various factors, and this makes it rather difficult to incorporate three high-voltage vacuum interrupters in a movable circuit breaker unit of the maximum permissible width.

An object of the present invention is to arrange the bus bars, the line conductor terminals, and the vacuum interrupters in such a manner that the interrupters can be readily accommodated in a movable circuit breaker unit of a simple and inexpensive construction that is well within the maximum permissible width.

Another object is to mount the interrupters on the movable circuit breaker unit in such a manner as to eliminate the need for the usual terminal bushings that are customarily provided on a movable circuit breaker unit to support the conductive connecting studs leading to and from the interrupters.

Still another object is to arrange the bus bars and the line conductor terminals in such a manner that parts of a simple configuration and construction can be used fo establishing connections to the interrupters when th circuit breaker unit is in its connected position.

Another object is to arrange the bus bars and line con ductor terminals in such a manner that the bus bars ca readily be individually enclosed in grounded metal com partments where the bus bars are effectively isolate from each other and from the line conductors and thei terminals.

In carrying out our invention in one form, we provid a switchgear unit for controlling a three-phase A.C. cir cuit that comprises three buses extending into the uni in spaced-apart relation and three line conductors insu lated from each other and adapted to be electrically con nected, respectively, to said three buses. Each of th phases extends through one of the buses and an asso ciated one of the line conductors. The switchgear uni comprises three vertically-spaced stationary disconnec contacts respectively connected to the three buses an three additional vertically-spaced stationary disconnec contacts adapted to be respectively connected to th line conductors. The pair of disconnect contacts that i in each phase of the circuit are located in horizontally spaced relationship to each other.

The switchgear unit further comprises a movable ci cuit breaker unit that is horizontally movable betwee a connected position and a disconnected position. Th circuit breaker unit comprises three vacuum interrupte respectively associated with the three phases of the ci cuit, each of the vacuum interrupters comprising tubular housing at least partially of insulating materi and conducting means forming a conductive path ther through when the interrupter is closed. These vacuu interrupters are mounted in vertically-spaced relationsh to each other with the longitudinal axes of the tubul housings extending generally horizontal. A pair horizontally-spaced studs is provided at opposite en of each of the tubular housings, and these studs proje from the housing transversely of its longitudinal axis a generally horizontally in the direction of movement the movable circuit breaker unit. Means is provided f electrically connecting the studs and the conducti means in the associated vacuum interrupter in seri Contacts are provided at the free ends of the horizontall spaced pair of studs for engaging a horizontal-spaced pa of disconnect contacts when the movable circuit break unit is moved into its connected position.

For a better understanding of the invention, referen may be had to the following description taken in conne tion with the accompanying drawings, wherein:

FIG. 1 is a side elevational view, partly in sectio showing metal-clad switchgear embodying one form the invention. The switchgear includes a movable circ breaker unit shown in its connected position inside stationary cabinet.

FIG. 1*a* is a diagrammatic showing of the power ci cuit in which the switchgear unit of FIG. 1 is connecte FIG. 2 is a side elevational view, partly in section, the switchgear of FIG. 1. This figure shows the mova circuit breaker unit withdrawn from its stationary cabin FIG. 3 is an end view of the switchgear of FIG. viewed from the front view of the switchgear. Certain the parts inside the switchgear are shown in dotted li form and certain others have been omitted for simplici FIG. 4 is a sectional view along the line 4—4 FIG. 3.

Figure 1:
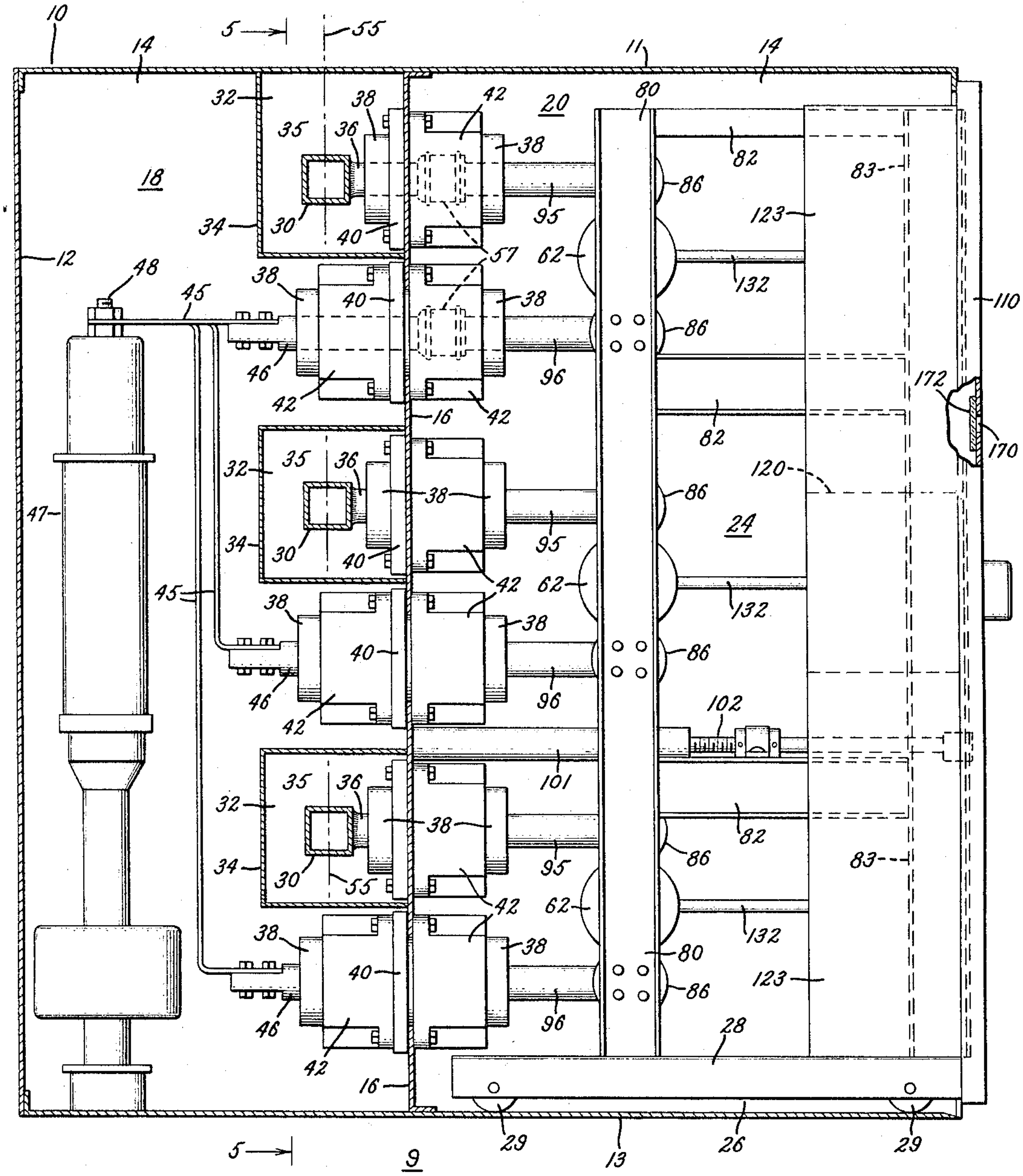

Referring now to FIG. 1, the switchgear unit 9 shown herein comprises a grounded metal cabinet 10 having a top wall 11, a back wall 12, and a bottom wall 13. At each of the laterally opposed sides of the cabinet are side walls 14, only one of which is visible in the sectional view of FIG. 1. Extending parallel to the back wall 12 between the side walls 14 is a vertically-disposed metal partition 16 that is suitably fastened to the walls of the cabinet and is at ground potential. This partition 16 is spaced from the back wall 12 to form a primary conductor compartment 18 between the partition and the back wall.

Figure 2:
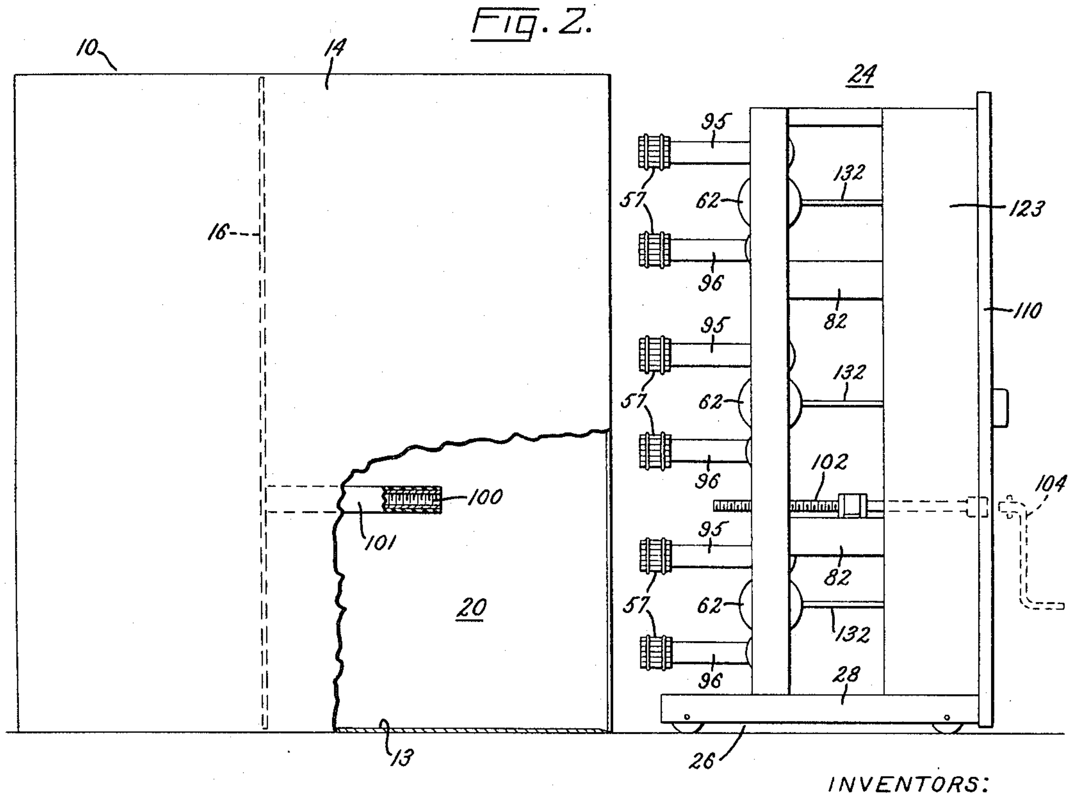
Figure 3:
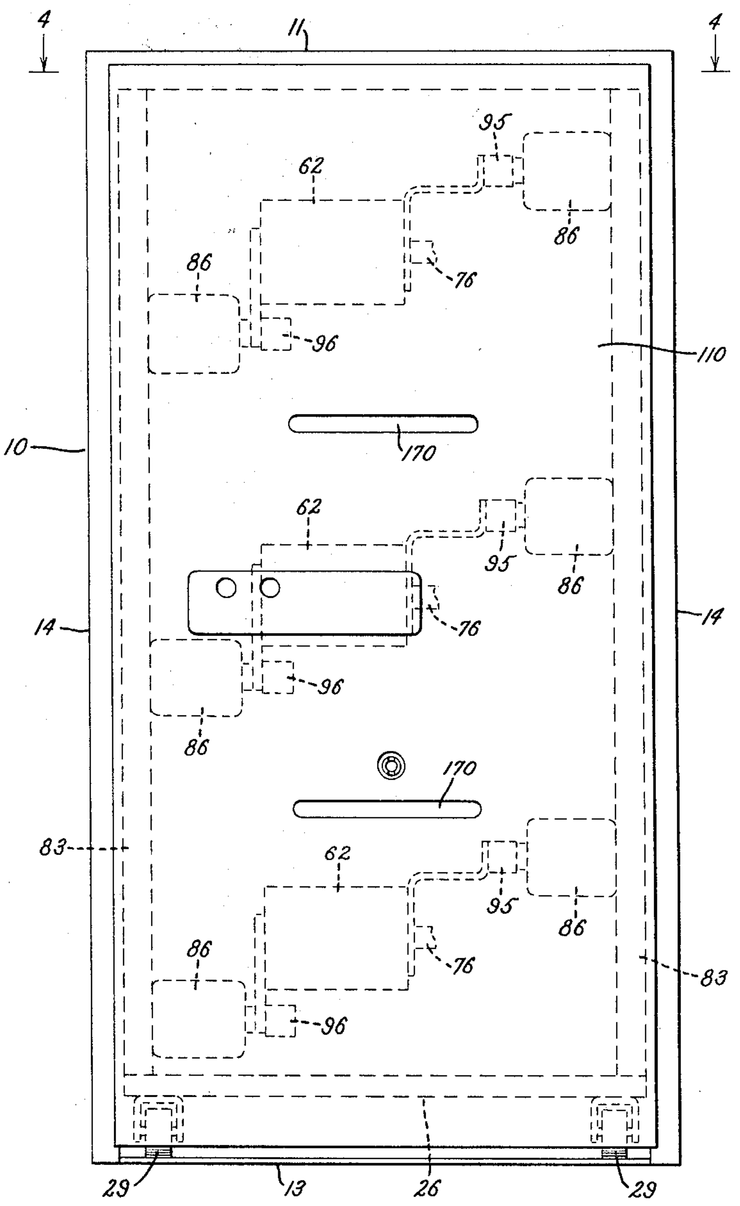

Located in front of the partition 16 is a breaker compartment 20. This breaker compartment 20 is adapted to receive a horizontally movable circuit breaker unit 24. In FIG. 2, the movable circuit breaker unit 24 is shown completely removed from the cabinet 10; and in FIG. 1, the movable circuit breaker unit is shown positioned in its connected position inside the breaker compartment 20 of the cabinet. The movable circuit breaker unit 24 comprises a truck 26 that comprises a base 28 mounted on suitable wheels 29. These wheels roll along the bottom wall 13 of the cabinet when the movable circuit breaker unit 24 is being withdrawn from or inserted into its connected position of FIG. 1. A more detailed description of the circuit breaker unit will soon be presented.

*Primary conductor compartment*

Returning now to the primary conductor compartment 18, there are three bus bars 30 located inside this compartment. In a typical installation, these three bus bars will constitute the three phases of a three-phase alternating current bus extending through the switchgear unit. These three bus bars 30 extend in a horizontal direction across compartment 18 and are disposed in vertically-spaced relationship to each other. Each bus bar 30 extends through the side walls 14 of the cabinet via aligned openings 32 provided therein. Each of the bus bars 30 is partially surrounded by a grounded metal housing 34 that is suitably fastened to the partition 16 and to the walls of the cabinet along their juxtaposed surfaces. The housing 34 about each bus bar cooperates with the adjacent partition 16 or cabinet wall, as the case may be, to form a grounded metal enclosure that substantially completely surrounds the bus bar. As will be apparent from FIGS. 1 and 5, the enclosed chambers 35 inside these bus enclosures are spaced from and physically isolated from each other. Thus, the bus construction can be considered to be of the isolated-phase bus type.

Each of the bus bars 30 is supported in its illustrated position in a switchgear unit by support means comprising a horizontally-extending stud 36 and a hollow insulator 38 surrounding the stud. This support means is shown in detail in FIG. 8, where the horizontally-extending stud 36 is shown welded to the bus bar 30 and projecting through the metal partition 16 toward the front of the cabinet 10. The hollow insulator 38, which is preferably of porcelain, surrounds the stud 36 and is suitably secured thereto, as by the mechanical joint shown at 39 in FIG. 8. This joint comprises an outwardly-extending shoulder 39*a* on stud 36 and a nut 39*b* threaded on the stud. An inwardly-extending annular flange on the insulator 38 is clamped between the shoulder 39*a* and the nut 39*b* of the stud.

Figure 5:
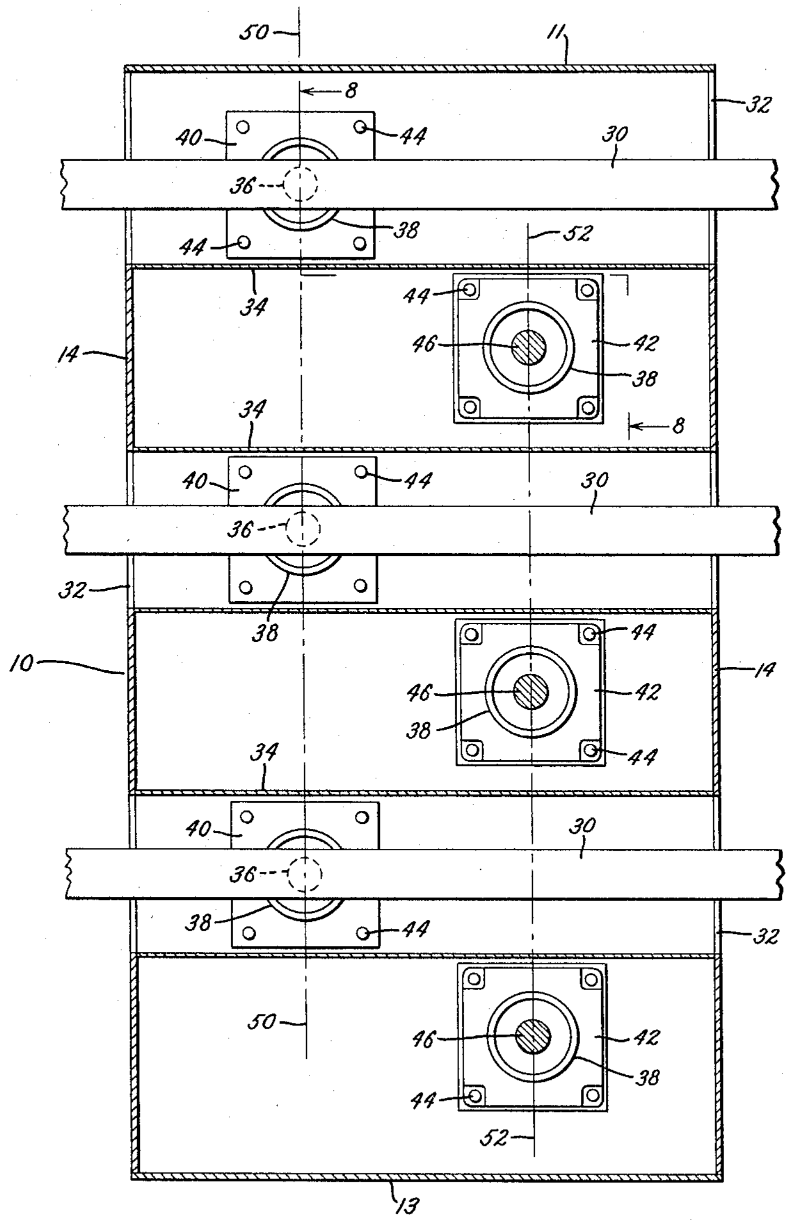
FIG. 5 is a sectional view along the line 5—5 FIG. 1.
Figure 8:
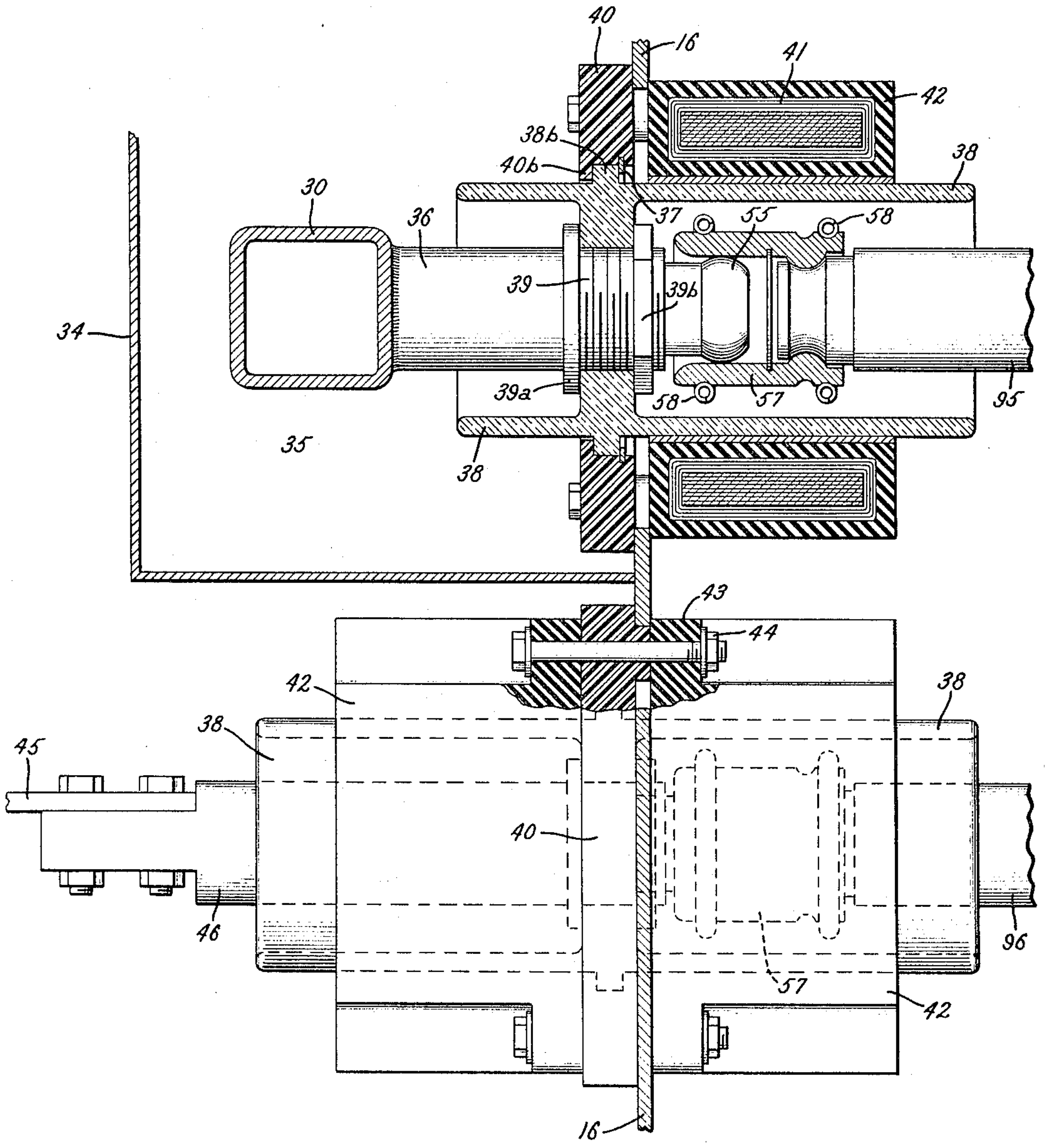
FIG. 8 is an enlarged sectional view along the line —8 of FIG. 5.

The hollow porcelain insulator 38 is supported on the metal partition 16 by an adapter 40 of insulating material that surrounds insulator 38 and is suitably secured thereto at the outer periphery of the insulator. In FIG. 8, the adapter 40 is shown with an internal shoulder 40*b* against which an external shoulder 38*b* on the porcelain insulator 38 abuts. A suitable retainer, shown as a snap ring 37, holds these two shoulders 38*b* and 40*b* together. The adapter 40 has a square outer peripheral configuration, as seen in FIG. 5, and is suitably bolted to the metal partition 16 by bolts 44 extending through its corners. The spacing between the grounded metal partition 16 and the high voltage stud 36 is made large enough to provide ample electrical clearance between these parts.

The hollow insulator 38, which surrounds stud 36, also projects through the metal partition 16 toward the front of the switchgear unit, as shown in FIG. 8. Surrounding the insulator 38 on the front side of the partition 16 is the usual current transformer 41. This current transformer 41 is imbedded in a suitable resin which forms a casing 42 therefor. This casing 42 has a generally square outer periphery with recesses partially extending therethrough at its corners to form mounting lugs 43 adjacent partition 16. Bolts 44 extend through these lugs 43 to clamp the casing 42 to the adapter 40 and partition 16.

Although only a single switchgear unit is shown in the figures, it is to be understood that usually there will be an adjacent switchgear unit at one or even both sides of the illustrated unit. These additional switchgear units will typically be of the same construction as the illustrated unit, and the primary conductor compartments of all the side-by-side units will be aligned. In such a line-up of switchgear units, each horizontally-extending bus bar 30 will extend through the aligned primary conductor compartments of the adjacent switchgear units and will be supported at a single location in each switchgear unit by support means corresponding to that shown at 36, 38 in FIG. 8 and described hereinabove.

Since the bus construction is of the isolated-phase bus type, it should be apparent that the occurrence of a fault in the primary conductor compartment 18 between the phases of the bus is virtually impossible. In the remote event of a fault in compartment 18 involving the bus bars, the fault will be to ground, i.e., to the grounded enclosure surrounding the bus bar, rather than between phases. The fact that each bus bar is supported at only a single location in each switchgear unit decreases the likelihood of even a ground fault since a minimum number of creepage paths from the bus to ground are present.

Figure 1A:
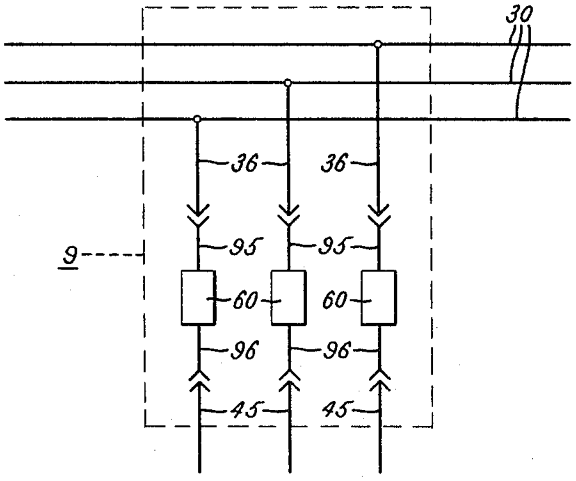
Figure 4:
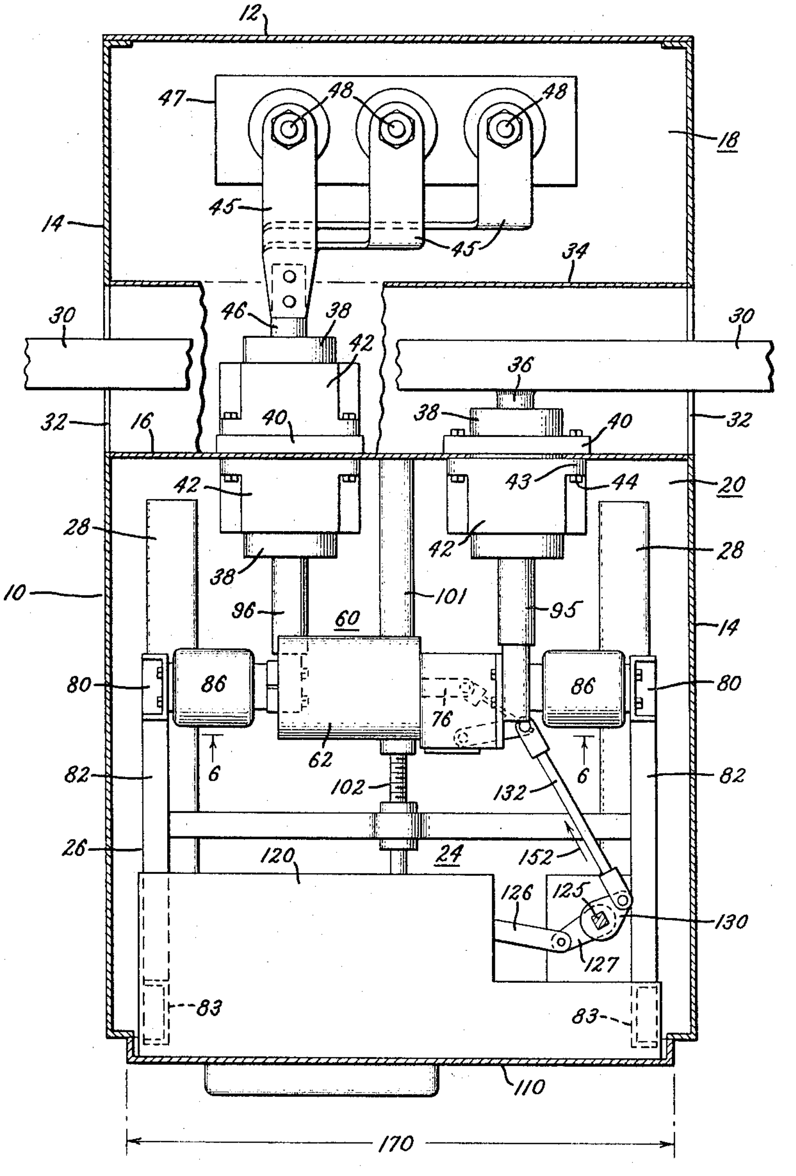

FIG. 1*a* is a schematic diagram of the power circuit through the switchgear unit 9. A purpose of the switchgear unit is to provide a connection between the three-phase bus constituted by bus bars 30 and a three-phase line constituted by line conductors 45. When the movable circuit breaker unit 24 is in its connected position depicted in FIG. 1*a* and is closed, the three line conductors 45 are respectively connected to the three bus bars 30. The line conductors 45 are shown in FIG. 1 extending from line terminals 46 of the switchgear unit to a conventional pot head 47 located at the rear of the primary conductor compartment. This pot head 47 serves to carry the line conductors 45 in insulated relationship through the bottom wall 13 of the switchgear unit to a point outside the switchgear unit. As shown in FIG. 4, the pot head 47 has three spaced-apart terminals 48 to which the line conductors 45 are respectively connected. In certain applications, the line conductors 45 will be in the form of insulated cables that extend to points outside the switchgear without relying upon a pot head for insulation.

Each line conductor terminal 46 is constituted by a horizontally-extending stud that extends through the metal partition 16. Each of the studs 46 is supported on the partition 16 by a hollow porcelain insulator 38 and an adaptor 40 that are substantially the same as the correspondingly-designated supporting parts for the bus-connected stud 36. FIG. 8 shows resin-imbedded current transformers 42 mounted around these line insulators 38 on both sides of the partition 16.

As will be apparent from FIG. 5, the bus-connected studs 36 are vertically aligned in a first vertical plane 50; and the line-connected studs 46 are vertically aligned in a second vertical plane 52, which is horizontally spaced from the first plane. As can also be seen in FIG. 5, the line-connected studs 46 are vertically staggered with respect to the bus-connected studs 36. This vertical staggering is important for a number of reasons. First, it permits a bus bar 30 of a simple straight line form to extend completely across the cabinet 10 in a horizontal direction without interference from the line connected studs 46. The vertical staggering also permits the housing 34 about the bus bar to be of a simple shape and to extend via a straight horizontal path across the cabinet 10 without interference from the vertically-offset line-connected studs 46. As shown in FIG. 1, the vertical staggering also permits line-connected studs 46 of a simple straight-line configuration to extend toward the back wall of the cabinet 10 past the vertical plane 55 of the bus bars 30 without interference from the bus bars or the housing 34 surrounding them.

The grounded housings 34 which surround the bus bars 30 not only isolate the bus bars from each other but also isolate the bus bars from the line conductors 45 in the compartment 18. This isolation reduces the opportunity for an electrical breakdown between a bus bar and line conductor. It will be noted that the line-connected studs 46 are sufficiently staggered with respect to the bus-connected studs that a large electrical clearance space, adequate to prevent breakdown, is provided between the line conductors 45, 46 and the grounded bus housing 34.

To facilitate assembly of the primary conductors inside the primary conductor compartment 18, the back wall 12 of the cabinet 10 is made removable from the cabinet. This enables the bus bars and line conductors to be suitably assembled from the back of the cabinet, after which the back wall is suitably bolted into its position shown in the drawings.

Although not shown in the drawings, it is to be understood that the primary conductors are covered with a suitable coating of insulation that maintains the required dielectric strength between the high voltage conductors and the adjacent grounded parts.

At the free end of each of the studs 36 and 46, a plug-type disconnect contact 55 is provided. These plug-type disconnect contacts 55 are located at the front of the metal partition 16 and are adapted to plug into socket-type disconnect contacts 57, carried by the movable circuit breaker unit 24, when the circuit breaker unit is moved into its connected position of FIG. 1.

*Movable circuit breaker unit*

Figure 6:
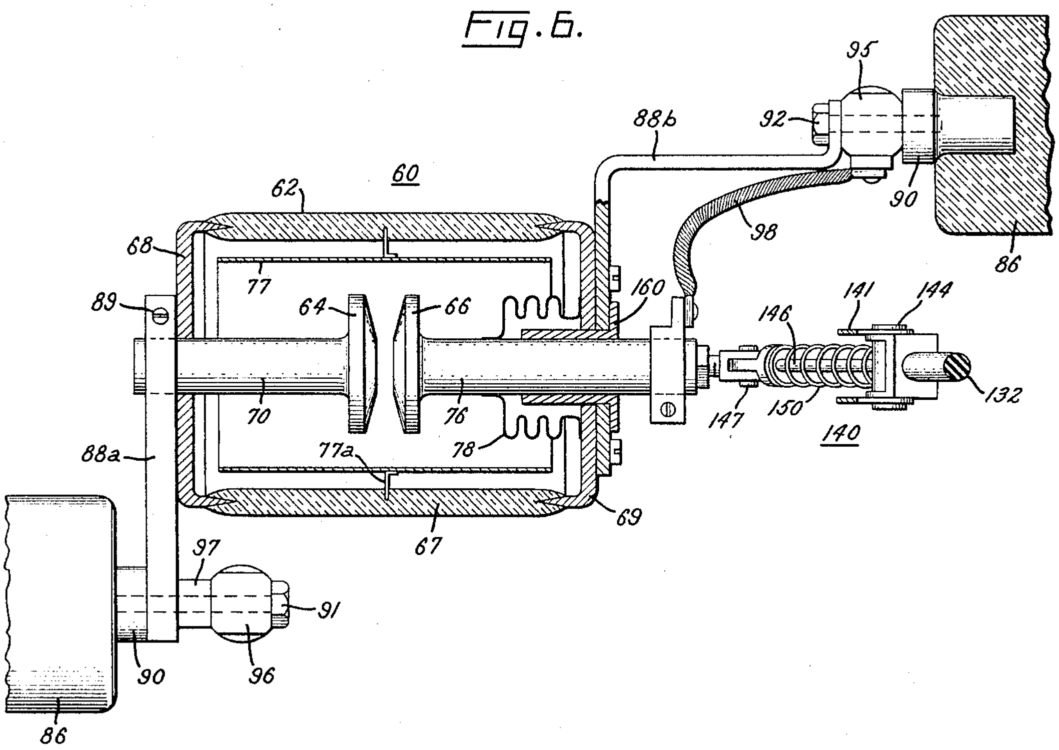
FIG. 6 is an enlarged sectional view along the li 6—6 of FIG. 1.

The movable circuit breaker unit 24 comprises three identical vacuum-type circuit interrupters 60. One of the circuit interrupters is provided for each phase of the power circuit, as may be clearly seen in the schematic illustration of FIG. 1*a*. The internal details of the circuit interrupter 60 form no part of the present invention and are therefore shown in schematic form only. For a more specific showing of an interrupter suitable for use in the disclosed circuit breaker, reference may be had to U.S. Patent 3,163,734-Lee, assigned to the assignee of the present invention. Referring to FIG. 6, generally speaking, the circuit interrupter 60 comprises an evacuated and sealed envelope 62 in which a pair of separable butt-type contacts 64 and 66 are mounted. The contacts have been suitably processed to free them of sorbed gases and contaminants that decompose in the presence of an arc to form permanent gases. The envelope 62 comprises a tubular housing 67 of insulating material and a pair of end caps 68 and 69 closing off the ends of a tubular housing and suitably sealed thereto. The left-hand contact 64 of FIG. 6 is a stationary contact that is supported on the inner end of a conductive rod 70. The conductive rod projects in sealed relationship through the left hand end of the envelope 62 and is rigidly attached to the end cap 68 as by welding.

The other contact 66 of the circuit interrupter is a movable contact brazed to the inner end of a conductive actuating rod 76, referred to hereinafter as the movable contact rod. This movable contact rod 76 is mounted for substantially straight-line movement along its longitudinal axis and projects through an opening in the right hand end cap 69. A flexible metallic bellows 78 is interposed between the right hand end cap and the movable contact rod 76 to provide a seal about the contact rod that allows for longitudinal movement thereof without impairing the vacuum inside the envelope 62.

Opening of the circuit interrupter of FIG. 6 is effected by applying a force to the contact rod 76 to drive the movable contact 66 to the right out of engagement with the other contact 64. This moves contact 66 from its dotted line position of FIG. 6 to its solid line position. Initial separation of the contacts establishes a circuit-interrupting arc between the contacts, and this arc will persist until about the time a natural current zero is reached. The arc will then vanish and be prevented from re-igniting by the high dielectric strength of the vacuum, thus completing the circuit interrupting operation. A tubular shield 77, preferably of metal, surrounds the contacts and condenses the metal vapors resulting from arcing. This shield is suitably supported on casing 67 by a metal disc 77*a* extending therethrough in sealed relationship.

Closing of the interrupter is effected by driving the right-hand contact 66 of FIG. 6 from its solid-line open position of FIG. 6 leftward into engagement with the other contact 64, thus reestablishing the power circuit through the interrupter.

The actuating means for effecting opening and closing motion of the contact rod 76 will soon be described in some detail, but first a description will be given of the structure that is relied upon for supporting each of the interrupters 60 and for carrying current to and from the interrupters.

For supporting the interrupters 60, a pair of rigid metal frames 80 of channel-form are provided at the laterally opposed sides of the truck 26. Each of these frames 80 is welded at its lower end to the base 28 of the truck 26. At vertically-spaced points along their length, each of the frames 80 is welded to horizontally-disposed braces 82 that extend toward the front of the truck. Additional vertical frame members 83 are disposed near the front of the truck at its laterally-opposed sides, and the horizontally extending braces 82 are suitably welded to these frame members 83.

The vacuum interrupters 60 are mounted between the frame members 80 with the longitudinal axis of each interrupter extending in a horizontal direction. This can be seen in FIGS. 1, 3, and 4. For mounting each of the interrupters in this position, a pair of pedestal-type insulators 86 are provided at opposite ends of the vacuum interrupter. In the embodiment of FIGS. 1–7, each of these pedestal-type insulators 86 has its outer end suitably secured to a frame member 80 at one side of the truck. At the inner end of the insulators 86, there are metallic supporting brackets 88*a* and 88*b* supporting the vacuum interrupter thereon.

Referring to FIG. 6, bracket 88*a* is a flat plate that is suitably clamped by screws 91 at its lower end to a conventional end fixture 90 on the pedestal insulator 86. The upper end of the bracket 88*a* is split to receive the projecting outer end of stationary rod 70 and is suitably clamped thereto by a screw 89.

The other bracket 88*b*, shown in FIG. 6, is an L-shaped member that has its vertical leg suitably clamped to the end plate 69. An upturned lug 90 on the other leg is clamped by screws 92 to the usual end fixture 90 of insulator 86.

For carrying current to and from each interrupter, a pair of spaced apart, horizontally extending conductive studs 95 and 96 are provided at opposite ends of each interrupter 60. These studs 95 and 96 project from the vacuum interrupters toward the stationary disconnect contacts 55 generally parallel to the direction of movement of the movable circuit breaker unit. As best shown in FIGS. 1, 2 and 8, the studs 95 and 96 carry at the ree ends the previously-mentioned socket-type disconıect contacts 57 that mate with stationary contacts 55. The disconnect contacts 57 can be of any suitable con'entional form, but each is preferably constituted by a ,eries of fingers arranged in a tubular pattern and en:ircled by a pair of garter springs 58, as shown in FIG. 8. These garter springs 58 tend to contract the tubular socket :ontact 58, thus holding it on its stud 95 or 96, providing :ontact pressure therebetween, and also providing contact ›ressure between the socket 57 and the plug 55 when the ;ocket is forced onto the plug. Each of the studs 95 is ;ubstantially aligned with one of the bus-connected studs 16 in the cabinet 10, and each of the studs 96 is sub;tantially aligned with one of the line-connected studs 46 n the cabinet 10. Thus, each of the plug-type disconnect :ontacts 55 is positioned to enter its associated socket dis:onnect contact 57 when the movable circuit breaker unit s fully inserted.

The opposite end of each of the studs 95 or 96 is sup›orted on one of the pedestal insulators 86. As shown n FIG. 6, the stud 95 is bolted between the bracket 88*b* ınd the right hand pedestal insulator 86 by screws 92. The other stud 96 is suitably bolted by screws 91 to the other pedestal insulator. A conductive spacer 97 that is clamped between the stud 96 and bracket 88*a* carries ›urrent between these parts and appropriately locates the stud 96. Current is conducted between the stud 95 and movable contact rod 76 by means of flexible metallic braid 98. This braid is suitably attached at one end to the stud 95 and at its other end to the movable contact rod 76. The flexible metallic braid permits the contact rod 76 to move without affecting the connection between parts 76 and 95. Assuming that the movable circuit breaker unit is in its connected position and the vacuum interrupters 60 are closed, current in each phase can flow serially through the following parts, best shown in FIG. 6: stud 95, braid 98, contact rod 76, contacts 66, 64, contact rod 70, bracket 88*a*, spacer 97, and stud 96.

When it is desired to move the movable circuit breaker unit 24 from its withdrawn position of FIG. 2 into its connected position of FIG. 1, the truck 26 is pushed horizontally to the left into the cabinet 10. After the truck has been pushed a predetermined distance into the stationary cabinet 10, a suitable racking mechanism is used to complete the insertion operation. This racking mechanism can be of any suitable conventional form, but we prefer to use the racking mechanism shown and claimed in U.S. Patent 2,885,502—Eichelberger and Lester, assigned to the assignee of the present invention. Since this racking means forms no part of the present invention, it is schematically shown and will be only briefly described.

Generally speaking, this racking mechanism comprises an internally threaded nut 100 generally fixed through a tubular member 101 to the cabinet 10 and an externally-threaded jack screw 102 axially fixed with respect to the movable truck but rotatable thereon. When the truck has been sufficiently inserted, the free end of the jack screw 102 meshes with the nut 100, and rotation of the jack screw then forces the movable circuit breaker unit into its fully connected position, overcoming the frictional opposition of the disconnect contacts 57, 55. Rotation of the jack screw is effected by means of a suitable wrench 104 applied to the right hand end of the jack screw. The wrench 104 can be inserted through an opening in a protective panel 110 suitably secured to the front side of the movable circuit breaker unit 24.

The movable circuit breaker unit 24 can be racked out of its fully connected position of FIG. 1 simply by rotating the jack screw 102 in a direction opposite to that just described. This jack screw rotation drives the movable circuit breaker unit to the right until the disconnect contacts 55 and 57 are substantially out of engagement. At this point, the jack screw and the nut 100 disengage. Thereafter the movable circuit breaker may be rolled manually from the cabinet 10 without restraint from the disconnect contacts or the racking mechanism. It should be understood that suitable interlocks (not shown) are provided to prevent the movable circuit breaker unit from being moved out of or into its connected position while the vacuum interrupters 60 are closed, thereby preventing any arcing from occurring at the disconnect contacts upon withdrawal or insertion of the movable circuit breaker unit. It should also be understood that a suitable shutter (not shown) is provided to automatically cover the stationary disconnect contacts 15 when the movable circuit breaker unit is removed, thereby preventing accidental contact with these live parts.

*Contact operating means for the interrupters*

For producing circuit-opening and circuit-closing movement of the contact rods 76 of the three interrupters, a contact-operating mechanism 120 (shown in FIG. 1) is provided adjacent the front panel 110 of the movable circuit breaker unit. This contact-operating mechanism can be of any suitable conventional construction, and since its details form no part of the present invention, it is shown in block form only. The mechanism 120 is supported on the frame members 83 of the truck 26 at a location that is approximately in vertical alignment with the center vacuum interrupter 60. At laterally-opposed sides of the mechanism are a pair of metallic side barriers 123 that prevent access to the mechanism when the movable circuit breaker unit is partially withdrawn. These side barriers 123 are suitably fixed to the truck 26.

For transmitting forces between the operating mechanism 120 and the interrupter 60, a vertically-extending rotatable actuating shaft 125 (shown in FIG. 4) is provided. This actuating shaft 125 is located near the front of the truck 26 at one side thereof and extends in a vertical direction from the level of the mechanism 120 to the levels at which the upper and lower interrupter 60 are located. The actuating shaft 125 is journaled in suitable stationary bearings (not shown) provided on braces 82. As shown in FIG. 4, the operating mechanism comprises an output arm 126 that is pivotally connected to the rotatable shaft 125 through a crank 127 that is suitably fixed to the shaft. When the operating mechanism operates, it effects rotation of the shaft 125 through these parts 126 and 127.

At the level of each interrupter, there is an operating crank 130 that is also fixed to the actuating shaft 125. Each of these three operating cranks 130 is coupled to the movable contact rod of an associated interrupter through an insulating operating rod 132, shown in FIGS. 4, 6, and 7. Each of these insulating operating rods 132 is pivotally connected at one end to the free end of an associated crank 130 and is operatively connected at its other end to the contact rod 76. When the actuating shaft 125 is rotated in a clockwise direction from its position of FIG. 4, it simultaneously drives the operating rods 132 in the direction of the arrow 152 in FIG. 4 to produce substantially simultaneous closing of the interrupters. When actuating shaft 125 is driven in a reverse direction from its closed position, it simultaneously pulls the operating rods 132 in a direction opposite to the arrow 152 thereby simultaneously opening the three interrupters.

Figure 7:
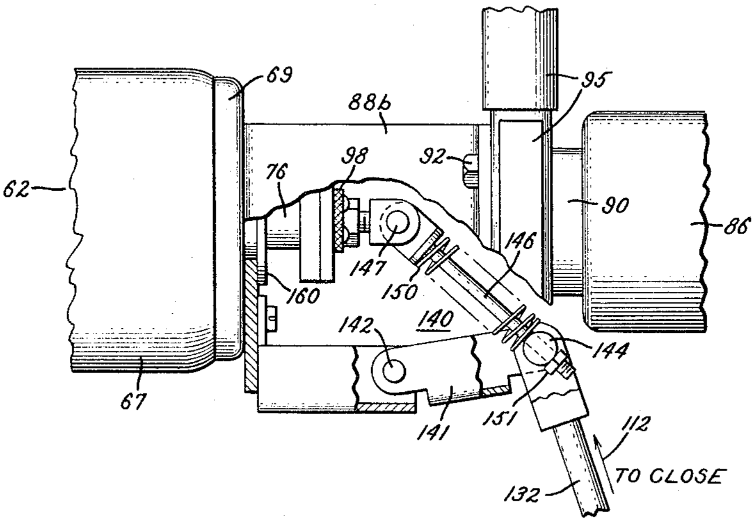
FIG. 7 is a plan view of a portion of FIG. 6.

For connecting each of the operating rods 132 to its associated movable contact rod 76, there is provided force-transmitting means 140, which can best be seen in FIG. 7. A basic purpose of this force transmitting means 140 is to convert longitudinal motion of the operating rod 132 into longitudinal motion of the contact rod 76. Another purpose of the force-transmitting means 140 is to provide contact-wipe at the end of a closing operation, as will soon be explained. The force-transmitting means 140 is substantially the same as that claimed and disclosed at 100 in Patent 3,163,735—Miller, assigned to the assignee of the present invention, and reference may be had to that patent if a more detailed explanation is desired. In general, this force-transmitting means 140 comprises a guide link 141 that is pivotally supported at one end on a stationary pivot 142 and is pivotally connected at its opposite end to the operating rod 132 by means of a pivot 144. The force-transmitting means 140 further comprises an intermediate link 146 of rod form that is pivotally connected at one end to the contact rod 76 and is pivotally connected with lost motion at its opposite end to the operating rod 132. The connection to the contact rod is through pivot 147, and the connection to the operating rod is through the previously-described pivot 144, which is carried by the operating rod 132 and is journaled in the operating rod 132 for rotation relative to the operating rod. This latter pivot 144 has a transversely-extending hole therethrough which slidably receives the intermediate rod 146 to permit motion of pivot 144 along the length of intermediate rod 146. Disposed between pivot 144 and the other end of the intermediate rod 146 is a compressing spring 150 that encircles the intermediate rod 146. This compression spring 150 tends to urge the pivot 144 against the stop 151 fixed to the intermediate rod 146. Since the compression spring 150 is carried by the intermediate rod 146, it will be apparent that the spring moves bodily with the intermediate rod during all interrupter operations.

When the operating rod 132 is driven in the direction of arrow 152 to initiate a circuit breaker-closing operation, driving forces are transmitted through the compression spring 150 to force contact rod 76 to the left, thereby moving contact 66 into engagement with contact 64. Following this engagement, operating rod 132 continues moving in the direction of arrow 152, forcing pivot 144 to slide along the intermediate rod 146, compressing spring 150, and opening a space between the pivot 144 and stop 151. This overtravel action during which the spring 150 is compressed serves primarily to provide contact-wipe. More specifically, this action assures that the contacts 66, 64 are firmly driven into engagement despite loss of contact material through wear and arc-erosion and without blocking the contacts of the other interrupters from engaging should the contacts of one of the interrupters engage ahead of the contacts of the other interrupters. Corresponding spring couplings are provided on the other interrupters to compensate for contact wear and arc-erosion in these interrupters and permit the contacts of the illustrated interrupter to be driven into engagement should the contacts of the other interrupters engage first. Because of the role it plays in providing contact-wipe, the force-transmitting means 140 is also referred to as contact-wipe mechanism.

For insuring straight line motion of the contact rod 76 during the above-described closing operation, a slide bearing 160 is provided about contact rod 76. This slide bearing 160 is suitably fixed to the stationary bracket **88*b*. Additional guide means (not shown) may be provided, if desired, to aid the slide bearing 160 in producing straight line motion of the contact rod 76**.

Contact-opening is effected by driving the operating rod 132 back to its position of FIG. 7 in a direction opposite to the arrow 152. During initial movement of the operating rod in this direction, no opening force is applied to the movable contact rod 76 since the pivot 144 is merely sliding along the intermediate rod 146 without driving the intermediate rod. This lost motion continues until the pivot 144 strikes stop 151. When this occurs, an abrupt opening force is applied to the movable contact 66, and it separates at high speed from contact 64 to produce interruption of the circuit, as previously described.

While a vacuum interrupter has a relatively small total volume and many other advantages as an interrupting device, it does require a relatively large amount of space in a direction perpendicular to the power circuit extending therethrough. In this respect, the cylindrical envelope 62 must be of a relatively large diameter in order to provide for the desired high current interrupting performance of the interrupter. In addition, a certain minimum spacing must be allowed between the cylinders of adjacent phases to provide for the necessary phase-to-phase electrical clearances. These factors can lead to perplexing space problems when an attempt is made to incorporate the interrupters in a movable circuit breaker unit of a given maximum width (depicted at 170 in FIG. 4). If the interrupters were to be disposed in side-by-side relationship with their axes extending vertically, then the movable circuit breaker unit would ordinarily not have enough width to accommodate interrupters of the required diameter with the desired lateral spacing between the envelopes. Special inter-phase insulation could be used to make available more width, or the interrupters could be arranged in a complicated staggered pattern, but these approaches lead to a more costly and complex and less reliable construction.

We have overcome many of the above problems by arranging the vacuum interrupters in vertically-spaced relationship with their axes extending generally horizontally. In such an arrangement the inter-phase spacing is determined by the maximum permissible vertical dimension, or height, of the movable circuit breaker unit, rather than its maximum permissible width. Since a much larger vertical dimension is available than width, there is ample room for vacuum interrupters having the required diameter and spaced by the desired amount. Enough inter-phase spacing is available to eliminate the need for any special insulating barriers between the interrupters. Moreover, the fact that the interrupters are completely sealed devices assures that the dielectric properties of the insulating space will not be impaired by any arcing products resulting from interrupter-operation.

The large inter-phase space that is available for the interrupters in our design makes it possible to utilize a simple arrangement for mounting and conducting current through the interrupters. In this respect, the three interrupters can be located in a single vertical plane, as viewed in FIG. 1, thus permitting them to be mounted on simple vertically-extending beams 80 of straight line form, with all the connecting studs 95, 96 being of identical form and size. There is no need for complicated, staggered arrangements of the interrupters which would require connecting studs of intricate shapes or studs which differ from one interrupter to the next. In addition, all the supporting parts used for one interrupter, such as the insulators 86 and brackets **88*a* and 88*b***, can be of an identical construction to those used for the other interrupters. The use of identical parts in many locations results in lower manufacturing costs and less difficulty in keeping a spare parts supply.

It will be apparent that there is a high degree of compatability between the vacuum interrupter mounting arrangement and the primary conductor mounting arrangement. These two mounting arrangements are such that the connections between the interrupters 60 and the primary conductors 30, 45 can be made with structurally simple parts of an essentially straight line configuration. In this respect, note that the studs 95 and 96 on the movable circuit breaker unit and the studs 36 and 46 on the stationary cabinet are all of a simple straight-line, or rectilinear form. There is no need for any intermediate parts of intricate shape or expensive construction to provide connections between the bus or line conductors and the interrupters.

The usual movable circuit breaker unit of the general voltage class illustrated comprises terminal bushings for supporting the interrupters on the movable truck. In this respect, the usual movable circuit breaker unit includes a grounded metal plate fixed to the truck and extending across the back face of the movable unit. The usual studs carrying current to and from the interrupters pierce this grounded metal plate, and cylindrical insulating shell surround the studs to insulate them from the grounded metal plate. The studs and their surrounding cylindrical insulating shells are customarily referred to as bushings. We are able to eliminate the need for such bushings because the back face of our movable circuit breaker unit is essentially open and contains no grounded metal supporting plate that must be pierced by the studs (95, 96) and also because we use the pedestral-type insulators (86) for supporting the interrupters. These pedestal-type insulators are advantageous in that they are less susceptible to dielectric problems than are bushing-type insulators. The pedestal-type insulator is not required to carry a high voltage conductor through a ground plane, and the usual electrical stress concentrations developed at this intersection are absent.

It will be apparent that the mounting arrangement used for the interrupters allows them to be operated with simple linkages 132, 140 that have essentially identical parts for each interrupter. In this respect, since all of the movable contact rods 76 are located at the same end of their respective interrupters and since the adjacent pedestal insulator 86 for each interrupter is vertically offset from the contact rod 76, we make available an unobstructed space at the right and end of each interrupter (as viewed in FIGS. 4 and 6) where the interrupter's linkage can be readily accommodated. By using a vertically-extending operating shaft (125) that extends through the various levels at which the interrupters are located at equal distances from the contact rods 76, linkages of the same effective length can be employed for connecting the contact rods 76 to the common operating shaft. By locating the operating shaft 125 near the front of the movable circuit breaker unit, insulated operating rods 132 of the required length for electrical creepage can be employed without requiring additional width for the movable circuit breaker unit. In addition, this location of the operating shaft 125 near the front of the movable circuit breaker unit disposes the shaft 125 near the operating mechanism 120 and thus permits a short and simple connection to be used between the mechanism 120 and the operating shaft. By locating the operating mechanism at an intermediate point, preferably a midpoint, along the length of shaft 125, we can minimize any differences in torsional deflection of the shaft between the various interrupters. By using identical linkages 132, 140 of the same construction for each interrupter and by operating them from the centrally-located mechanism 120 through a common operating member 125, we facilitate synchronized operation of the three interrupters.

Another feature of our circuit breaker is that its construction permits an operator to visually determine whether the disconnect contacts 55 and 57 are separated when the movable circuit breaker unit is partially withdrawn from its cabinet 10. In this respect, observation slots 170, covered by suitable safety glass 172, are provided in the front panel 110. Through these slots 170, an operator, with the aid of a flashlight, can see the disconnect contacts 57 on the movable circuit breaker unit when these contacts are outside the insulating tubes 38. The large spacing that is present between the interrupters 60 and the uncluttered arrangement of the interrupters on the movable truck provide unobstructed, straight-line observation paths extending between the slots and the disconnect contacts.

Figure 9:
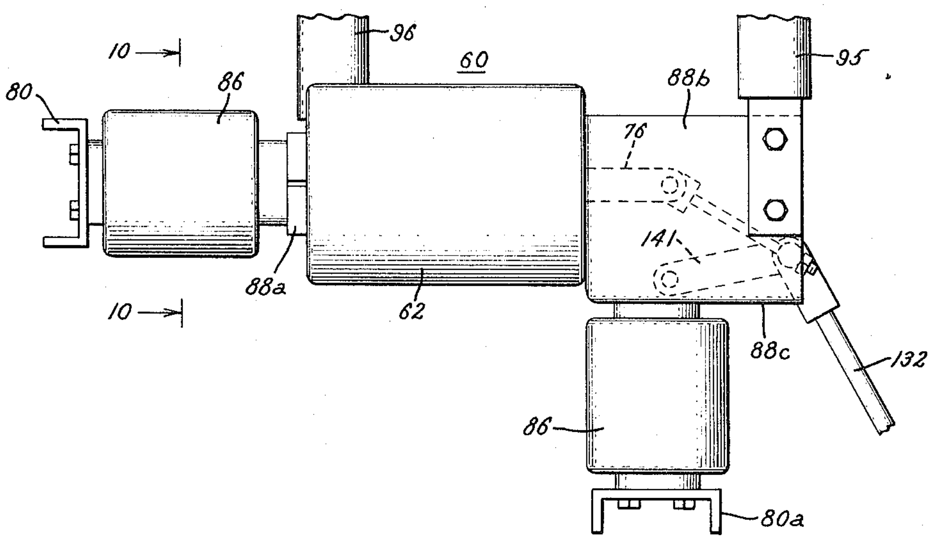
FIG. 9 is a plan view of the interrupter portion of modified form of switchgear unit.
Figure 10:
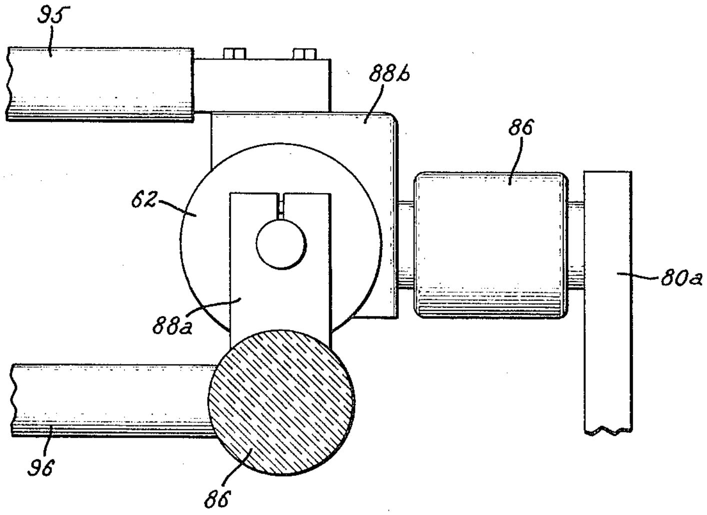
FIG. 10 is a sectional view along the line 10—10 of FIG. 9.

FIGS. 9 and 10 illustrate a slightly modified mounting arrangement for supporting each of the vacuum interrupters on the truck 26. In this modified mounting arrangement, the pedestal insulator 86 adjacent the movable-contact end of the interrupter 60 is located with its axis perpendicular to the axis of the interrupter, rather than parallel to the interrupter axis as in FIGS. 1–7. In addition, this axis of insulator 86 of FIGS. 9 and 10 is in the same horizontal plane as the interrupter axis, rather than being vertically offset from the interrupter axis as in FIGS. 1–7.

The rear end of the right hand insulator 86 of FIG. 9 is mounted on a vertically-extending beam, designated **80*a*. This vertically-extending beam 80*a* is rigidly joined, in a suitable manner (not shown), to the truck framework made up of the beams 80, 82, 83 of FIG. 6. But the beam 80*a* of FIG. 9 is located in a position spaced from the right hand edge of the truck 26, as contrasted to the location of beam 80** in FIG. 4 at the extreme right hand edge of the truck.

The supporting bracket **88*b* of FIG. 9 between the insulator 86 and the interrupter 60 is substantially the same as the bracket 88*b* of FIGS. 1–7 except that the bracket 88*b* of FIG. 9 has an additional side wall 88*c* adjacent one edge thereof that is suitably bolted to the adjacent insulator 86. The stud 95 of FIG. 9 is secured to the bracket 88*b*** in generally the same manner as in FIG. 6. The remaining parts of the interrupter mounting arrangement of FIG. 9 are substantially the same as in FIG. 6.

The interrupter mounting arrangement of FIG. 9 has the advantage of being stronger and more rigid than that of FIG. 6. The relatively high opening and closing forces for the interrupter that are applied through the operating rod 132 load the right hand insulator 86 of FIGS. 9 and 10 primarily in compression (during opening) and in tension (during closing), rather than in bending as in FIG. 6. A porcelain insulator has greater strength under these compressive and tensile loadings than in bending. The location of the insulator 86 closer to the interrupter, closer to the pivot for guide link 141, and in the same horizontal plane as the interrupter axis also increases the rigidity of this mounting by providing less opportunity for deflection of the supporting bracket **88*b* under the influence of operating forces. Operating forces applied through the guide link 141 are transmitted substantially directly to the insulator 86 rather than through the relatively long couple arm formed by bracket 88*b* in FIG. 6. The mounting of FIGS. 9 and 10 derives increased rigidity from the fact that the added wall 88*c* converts the bracket 88*b* into a box-like member which is inherently more rigid than the L-shaped bracket 88*b*** of FIG. 6.

The right hand insulator 86 of FIG. 9 is also in a better position to resist the tendency of electromagnetic forces to lengthen the loop in the U-shaped circuit through the movable switchgear unit. This U-shaped circuit configuration is most clearly apparent in FIGS. 4 and 9. These electromagnetic forces arise in a known manner when high currents flow through the U-shaped circuit. It will be apparent that these forces load the right hand insulator 86 primarily in compression.

While we have shown and described particular embodiments of our invention, it will be obvious to those skilled in the art that various changes and modifications may be made without departing from the invention in its broader aspects, and we, therefore, intend in the appended claims to cover all such changes and modifications as fall within the true spirit and scope of our invention.

What we claim as new and desire to secure by Letters Patent of the United States is:

1. In an electric switchgear unit for controlling a three-phase alternating current circuit that comprises three buses extending into said unit in spaced-apart relationship and three line conductors insulated from each other and adapted to be electrically connected, respectively, to said three buses, each of said phases extending through one of said buses and an associated one of said line conductors, said switchgear unit comprising:

(a) three vertically-spaced stationary disconnect contacts respectively connected to said three buses, (b) three additional vertically-spaced stationary disconnect contacts adapted to be respectively connected to said line conductors, (c) means for locating the pair of said disconnect contacts that is in each phase of said circuit in horizontally-spaced relationship to each other, (d) a movable circuit breaker unit horizontally movable between a connected position and a disconnected position, and comprising:

(i) three vacuum interrupters respectively associated with the three phases of said circuit, each of said vacuum interrupters comprising a tubular housing at least partially of insulating material and conducting means forming a conductive path therethrough when the interrupter is closed, (ii) means for mounting said vacuum interrupters in vertically-spaced relationship to each other with the longitudinal axes of said tubular housings extending generally horizontal, (iii) a pair of horizontally-spaced studs at opposite ends of each of said tubular housings projecting from said housing transversely of said longitudinal axis and generally horizontally in the direction of movement of said movable circuit breaker unit, (iv) means for electrically connecting said studs and said conducting means in the associated vacuum interrupter in series, (v) and contacts at the free ends of said horizontally-spaced pair of studs for engaging a horizontally-spaced pair of said disconnect contacts when said movable circuit breaker unit is moved into its connected position.

2. The switchgear unit of claim 1 in which:

(a) said line-side vertically-spaced stationary disconnect contacts are vertically staggered with respect to said bus-connected stationary disconnect contacts, (b) the stud at one end of each interrupter housing is vertically staggered with respect to the stud at the other end thereof sufficiently to cause said contacts at the free ends of said pair of studs to respectively engage one of said bus-connected stationary disconnect contacts and one of said line-side stationary disconnect contacts.

3. The switchgear unit of claim 1 in which said movable circuit breaker unit further comprises:

(a) a pair of frames secured to said movable unit, (b) a pair of stud-supporting pedestal-type insulators at opposite ends of each of said tubular housings, (c) and means for mounting the insulators of each pair between said studs and said frames.

4. The switchgear unit of claim 1 in which:

(a) said buses extend substantially horizontally across said switchgear unit in a direction substantially perpendicular to the direction of movement of said movable circuit breaker unit, (b) said horizontally-extending studs that connect to said buses are of a substantially rectilinear configuration and are at the same vertical levels as their respective buses, and (c) said bus-connected disconnect contacts are substantially vertically aligned with their respective buses and their respective horizontally-extending studs.

5. The switchgear unit of claim 4 in which:

(a) said line-side disconnect contacts are vertically staggered with respect to said bus-connected disconnect contacts, and (b) said horizontally-extending studs that connect to said line-side disconnect contacts are of a substantially rectilinear configuration and are at the same vertical levels as their respective line-side disconnect contacts.

6. A movable circuit breaker unit comprising:

(a) a truck that is horizontally movable between connected and disconnected positions, (b) a pair of frames secured to said truck, (c) a plurality of vacuum interrupters, each comprising a tubular housing at least partially of insulating material and conducting means forming a conductive path through said tubular housing when the interrupter is closed, (d) means for mounting said vacuum interrupters in vertically-spaced relationship to each other with the longitudinal axes of said tubular housings extending generally horizontally, (e) said mounting means comprising insulators between said tubular housings and said frames, (f) a pair of horizontally-spaced studs at opposite ends of each of said tubular housings projecting from said housing transversely of said longitudinal axis and generally horizontally in the direction of movement of said truck into its connected position, (g) means for electrically connecting said pair of studs and said conducting means in the associated vacuum interrupter in series, (h) and disconnect contacts at the free ends of said studs for carrying current to and from said studs.

7. The movable circuit breaker unit of claim 6 in which said movable unit has an open back through which said studs extend without piercing any grounded metal on said movable unit disposed adjacent said studs.

8. The movable circuit breaker unit of claim 6 in which each of said vacuum interrupters comprises a movable contact rod projecting from its housing toward the same side of said truck, said circuit breaker unit further comprising:

(a) a mechanism for operating the movable contact rods of said vacuum interrupters, (b) means for mounting said mechanism on said truck, (c) a vertically-extending rotatable shaft coupled to said mechanism for transmitting force between said mechanism and said interrupters, (d) a plurality of linkages respectively associated with said interrupters, each linkage being connected at one end to said rotatable shaft and at its other end to the movable contact rod of its associated interrupter, and (e) said linkages being connected to said rotatable shaft at vertically-spaced levels generally aligned with said interrupters.

9. The movable circuit breaker unit of claim 8 in which:

(a) said movable circuit breaker unit has a front at the opposite end thereof from its disconnect contacts, (b) said vertically extending operating shaft is located near said front in a location spaced from said interrupters in the direction of truck movement, and (c) said operating mechanism is connected to said operating shaft at a location between the uppermost and lowermost of said interrupters.

10. An electric switchgear unit comprising:

(a) a grounded metal cabinet having a back wall and spaced side walls, said side walls containing generally aligned openings, (b) three horizontally-extending bus bars extending through said openings and across the interior of said cabinet in vertically-spaced relationship to each other, (c) a vertically-extending partition in said cabinet spaced from said back wall and located in front of said bus bars, (d) a first set of horizontally-extending studs respectively connected to said bus bars and projecting from said bus bars through said partition, (e) a first set of stationary disconnect contacts respectively located on the free end of said studs, (f) a first set of insulators respectively surrounding said studs and supporting their associated studs and bus bars on said partition, (g) grounded metal housings respectively mounted about said bus bars and providing substantially enclosed chambers in which the respective bus bars are located in isolated relationship to each other, (h) a second set of horizontally-extending studs vertically-spaced from each other and extending through said partition, said second set of studs being adapted for connection to line conductors located in th cabinet space between said partition and said back wall, (i) a second set of insulators respectively supporting the studs of said second set on said partition in horizontally-spaced, vertically-staggered relationship to the studs of said first set, (j) said second set of studs being so located that they are disposed outside the enclosures around said bus bars, (k) and a second set of stationary disconnect contacts respectively located on the studs of said second set in front of said partition.

11. The switchgear unit of claim 10 in combination with a second switchgear unit located at one side of said first unit and constructed as set forth in claim 10, the horizontally-extending bus bars of one unit being respectively aligned with and joined to the horizontally-extending bus bars of the adjacent unit.

12. A movable circuit breaker unit comprising:

(a) a truck that is horizontally movable between connected and disconnected positions, (b) a pair of frames secured to said truck, (c) a plurality of vacuum interrupters, each comprising a tubular housing at least partially of insulating material and conducting means forming a conductive path through said tubular housing when the interrupter is closed, (d) means for mounting said vacuum interrupters in vertically spaced relationship to each other with the longitudinal axes of said tubular housings extending generally horizontally, (e) said mounting means comprising a pair of spaced-apart insulators for each interrupter respectively located between the opposite ends of said tubular housing and said frames, (f) a pair of studs for carrying current to and from each interrupter and located at electrically opposite ends of said conductive path through said housing, said studs projecting from said housing transversely of said longitudinal axis and generally horizontally in the direction of movement of said truck into its connected position, (g) means for electrically connecting said pair of studs and said conducting means in the associated vacuum interrupter in series, (h) and disconnect contacts at the free ends of said studs for carrying current to and from said studs.

13. The movable circuit breaker unit of claim 12 in which:

(a) said frames are located at laterally-opposed sides of said truck, (b) said insulators have longitudinal axes extending generally parallel to the longitudinal axes of said tubular housing.

14. The movable circuit breaker unit of claim 12 in which:

(a) one of the insulators for each vacuum interrupter has a longitudinal axis extending generally perpendicular to the longitudinal axis of the associated tubular housing and at generally the same horizontal level as the longitudinal axis of the associated tubular housing, and (b) means is provided for operating each of said vacuum interrupters from the end of said tubular housing adjacent the location of said one insulator.

References Cited

UNITED STATES PATENTS

| | | | |
|---|---|---|---|
| 1,614,115 | 1/1927 | French | 200—50 |
| 2,617,862 | 11/1952 | Caswell | 200—50 |
| 2,885,501 | 5/1959 | Wood et al. | 200—50 |
| 2,979,590 | 4/1961 | Sandin | 200—144 XR |
| 3,002,129 | 9/1961 | Mueller | 200—50 |
| 3,015,756 | 1/1962 | Kreekon et al. | 200—50 |
| 3,163,735 | 12/1964 | Miller | 200—144 |
| 3,305,657 | 2/1967 | Roxburgh et al. | 200—144 |

FOREIGN PATENTS 1,049,468 1/1959 Germany.

ROBERT S. MACON, *Primary Examiner.*